(No Model.)
D. CURTIN.
HAND TREADLE ATTACHMENT.
No. 559,684. Patented May 5, 1896.
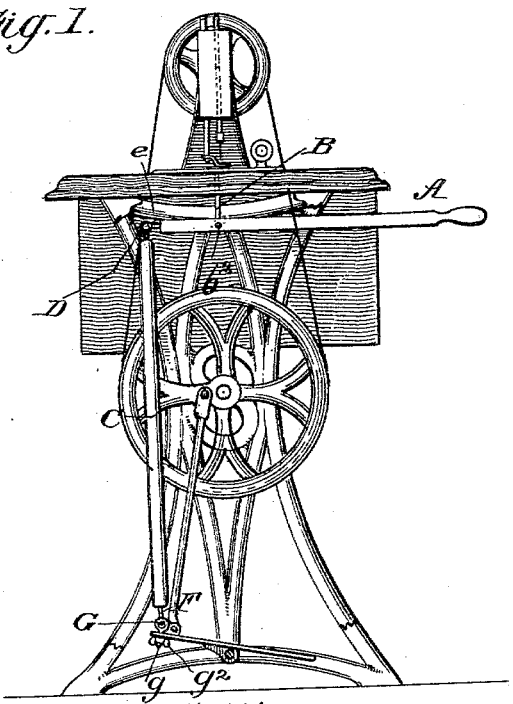
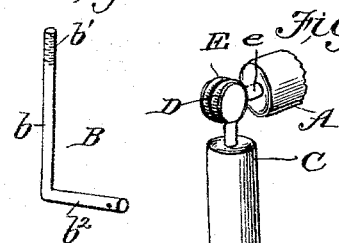
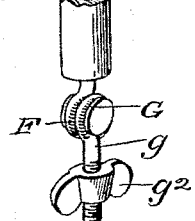
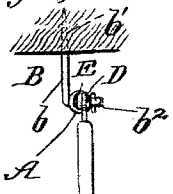
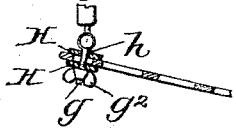
WITNESSES:
Jos. A. Ryan
P. B. Turpin.
INVENTOR:
David Curtin.
BY Munn & Co.
ATTORNEYS

UNITED STATES PATENT OFFICE.

DAVID CURTIN, OF INDIANAPOLIS, INDIANA.

HAND TREADLE ATTACHMENT.

SPECIFICATION forming part of Letters Patent No. 559,684, dated May 5, 1896.

Application filed August 1, 1895. Serial No. 557,875. (No model.)

*To all whom it may concern:*

Be it known that I, DAVID CURTIN, of Indianapolis, in the county of Marion and State of Indiana, have invented a new and useful Improvement in Hand Treadle Attachments, of which the following is a specification.

My invention is an improved hand treadle attachment intended especially for use on sewing-machines; and it consists in certain novel constructions, combinations, and arrangements of parts, as will be hereinafter described, and pointed out in the claim.

In the drawings, Figure 1 is a side view, partly broken away, of a machine provided with the improvements. Fig. 2 is a front elevation of the improvement. Fig. 3 is a detail view of the bracket, and Figs. 4, 5, and 6 are detail views.

The sewing-machine may be of any ordinary construction, as the improvement can be universally used, it in no wise interfering with the drive-wheel guards of any make of machine.

The hand-lever A is of suitable length and is provided between its ends with an opening fitting upon the pivot portion of the bracket B. This bracket B has its shank $b$ made with a suitable threaded point $b'$ to be forced into the under side of the machine-bed, and has at its lower end the pivot portion $b^2$, on which the hand-lever pivots. This bracket, it will be seen, is L shape, its pivot portion being adapted to permit the convenient application and removal of the hand-lever when desired. At its end the lever connects with the pitman C by means of the connected eyes D and E, the eye D being fixed to the pitman C and the eye E to the hand-lever, the latter connection being effected by turning the threaded shank $e$ of the eye E into the end of the lever A, as shown. At its lower end the pitman is attached directly to the treadle, being provided at such end with an eye F, connected with an eye G, the shank $g$ of which extends down through a hole $g'$, drilled in the treadle, and is secured by a nut $g^2$ below such treadle. It may be preferred in some instances to use the clamps H, (shown in Figs. 4 and 5,) such clamps fitting above and below an opening in the treadle, and having openings $h$ through which the shank $g$ of the eye G is passed and is secured below by the thumb-nut.

The construction is simple, inexpensive, easily applied and removed, efficient in use, durable, and can be stored in a small space when not in use.

Having thus described my invention, what I claim as new, and desire to secure by Letters Patent, is—

The improved hand attachment for treadles substantially as described consisting of the bracket made L shape having its shank threaded the lever having an opening fitting on the pivot portion of such bracket the pitman the connected eyebolts connecting said pitman and lever, the treadle-clamp having an opening the eye secured to the pitman, the eye connected with said pitman-eye and having its shank carried through the opening in the treadle-clamp and the nut securing said shank all substantially as and for the purposes set forth.

DAVID CURTIN.

Witnesses:
JOSEPHINE POWELL,
BURTON F. WATTS.